(12) United States Patent
Wang et al.

(10) Patent No.: US 12,388,955 B2
(45) Date of Patent: Aug. 12, 2025

(54) ASYNCHRONOUS ONLINE MEETING METADATA FLOW

(71) Applicant: Salesforce, Inc., San Francisco, CA (US)

(72) Inventors: Zhenyu Wang, San Francisco, CA (US); Tongzhou Zhou, San Francisco, CA (US); Priyadarshini Mitra, San Francisco, CA (US); Karthik Vijayan, Austin, TX (US); Sreya Basuroy, New York, NY (US); Heng Zhang, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 333 days.

(21) Appl. No.: 18/304,233

(22) Filed: Apr. 20, 2023

(65) Prior Publication Data

US 2024/0357058 A1    Oct. 24, 2024

(51) Int. Cl.
  *H04N 7/15*  (2006.01)
  *H04L 51/046*  (2022.01)
  *H04L 65/403*  (2022.01)

(52) U.S. Cl.
  CPC .......... *H04N 7/155* (2013.01); *H04L 51/046* (2013.01); *H04L 65/403* (2013.01)

(58) Field of Classification Search
  None
  See application file for complete search history.

(56) References Cited

U.S. PATENT DOCUMENTS

| | | | |
|---|---|---|---|
| 8,855,281 B2 * | 10/2014 | Kho | H04L 65/403 379/142.1 |
| 11,275,569 B1 | 3/2022 | Zhang et al. | |
| 11,314,767 B2 | 4/2022 | Ke et al. | |
| 11,467,949 B2 | 10/2022 | Zhang et al. | |
| 11,526,528 B2 | 12/2022 | Ke et al. | |
| 2011/0113117 A1 * | 5/2011 | Genest | G06F 11/3476 709/217 |
| 2013/0238729 A1 * | 9/2013 | Holzman | H04L 51/066 709/206 |
| 2018/0109757 A1 * | 4/2018 | Romano | H04N 7/147 |
| 2019/0289046 A1 * | 9/2019 | Weber | H04L 65/4053 |
| 2020/0320168 A1 * | 10/2020 | Shirbhate | H04L 51/42 |
| 2022/0012214 A1 | 1/2022 | Ke et al. | |
| 2022/0092048 A1 | 3/2022 | Ke et al. | |
| 2022/0237172 A1 | 7/2022 | Zhang et al. | |
| 2022/0342524 A1 * | 10/2022 | Rongrong | G06F 3/0486 |
| 2022/0345458 A1 | 10/2022 | Kumarji et al. | |
| 2022/0413999 A1 | 12/2022 | Zhang et al. | |
| 2023/0032159 A1 * | 2/2023 | Kalinichenko | H04L 12/1831 |

* cited by examiner

*Primary Examiner* — Quoc D Tran
(74) *Attorney, Agent, or Firm* — Polygon IP, LLP

(57) ABSTRACT

Online meeting software typically generates a flow of data. A server system is configured to receive the flow of data, which may include metadata. The data may include metadata of online meetings. Different types of metadata are generated by online meetings. Such different types of metadata are provided in different patterns. Different types of metadata are provided throughout the online meeting session or at various points of the session and are provided to various different elements of the server system. The various different metadata received are then parsed and certain specific metadata elements are identified to match the different metadata streams.

20 Claims, 9 Drawing Sheets

ASYNCHRONOUS ONLINE MEETING METADATA FLOW

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to online meetings and more specifically to online meeting and call recording metadata collection.

BACKGROUND

Online services often include data collection. The data collected allows for problematic areas of the online services to be fixed and for the online services to be improved in experience and quality. In certain situations, data collection can include the collection of normal data as well as metadata. Users may also utilize the metadata to determine aspects of the meeting.

BRIEF DESCRIPTION OF THE DRAWINGS

The included drawings are for illustrative purposes and serve only to provide examples of possible structures and operations for the disclosed inventive systems, apparatus, methods and computer program products for collection and sorting of metadata for online calls and meetings. These drawings in no way limit any changes in form and detail that may be made by one skilled in the art without departing from the spirit and scope of the disclosed implementations.

DETAILED DESCRIPTION

Figure 1:
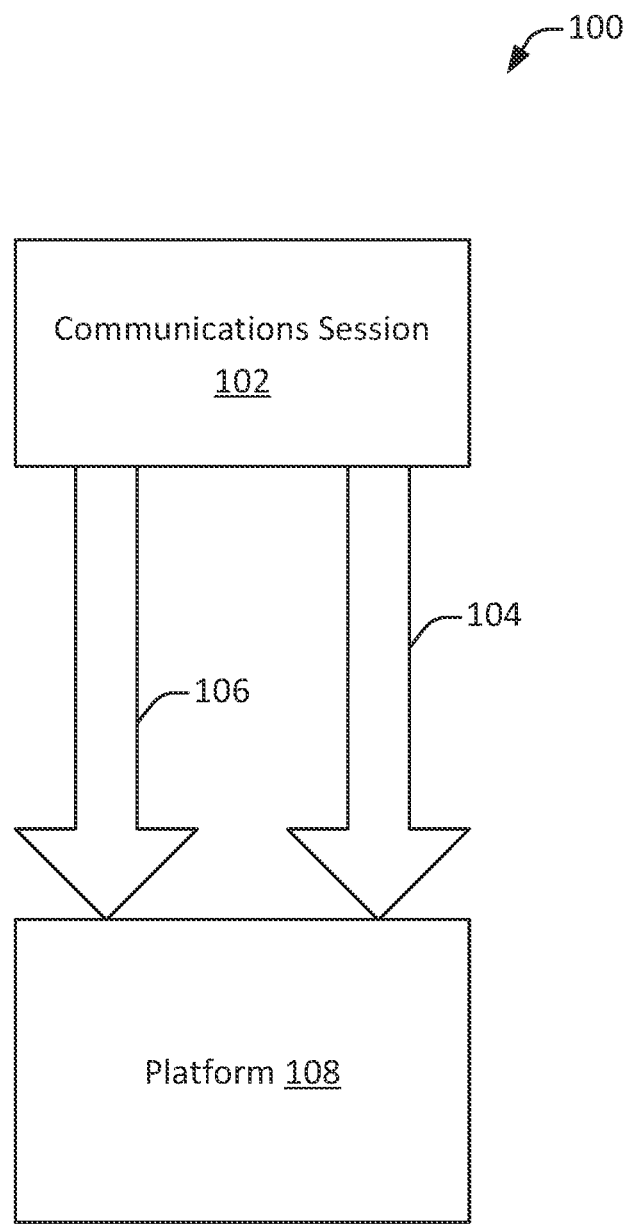
FIG. 1 illustrates an example of metadata flow in an online communications system, configured in accordance with one or more embodiments.

Online call and meeting software typically generates a flow of data, which is collected by various portions of a system. The data may include data of the online call or meeting (e.g., video or audio data of the call) as well as metadata (e.g., data such as the ID of the call or meeting, data identifying the participants, the time of the call or meeting, the duration of the call or meeting, and/or other such data that may indicate aspects of the call or meeting, but not of the video, audio, or text itself of the communications conducted during the call or meeting). Such data may be collected by various platforms as a part of customer service, telemetry, for process improvement, and/or for other such purposes. In certain embodiments, such data may be collected by a platform that may provide multi-tenant on-demand database service.

The data provided by various online call or meeting services may be in different patterns. For example, online calls and/or meetings may be conducted over a period of minutes or even hours. Data and/or metadata from such sessions may be provided throughout the session or through various portions of the session. Furthermore, such data may include various different categories of data directed to different portions of the session (e.g., the audio of the session, the video of the session, the main session, various subsessions, and/or other portions). As the data may be directed to different portions of the session, such data may be provided to various different elements of a platform (e.g., different databases), may be provided in different data streams, and may not be easily identifiable as parts of the same session (e.g., the different streams of data may not be labeled to identify that they are parts of the same session).

MarioSurf Coinbox is an online meeting software that provides for video calling and chat capabilities. Coinbox allows for an online meeting with chat, voice, and video capabilities and also allows for participants to conduct breakout sessions in separate rooms. Coinbox may be hosted on a variety of different platforms and provides metadata to the platform in a plurality of different streams. For example, Coinbox provides different metadata streams for the video/audio and chat portions of the various meetings. Different metadata streams may also be provided for the video/audio of breakout meetings.

The techniques described herein allows for a data collection technique that captures a plurality of different types of metadata (e.g., recording metadata and call record metadata) and automatically creates core objects containing the metadata for use by other electronic systems. These core objects may be enhanced or associated with insight and call structure as more information for corresponding recordings are available. Thus a data package containing such associated metadata may be created.

In certain embodiments, recording and call record (a.k.a. meeting) metadata may be collected and a centralized video reference repository may contain the metadata and provide metadata as needed. In various such embodiments, the actual video recording is not stored. Instead, metadata of the sessions are stored and a reference that points to the location of the recordings is provided. Such a configuration minimizes the memory requirements of the storage system.

The systems and techniques described herein allow for various metadata associated with a single session to be provided at different time periods. Thus, for example, recording metadata and notification may be provided and/or received at a first time period and call record metadata may be provided and/or received at a second time period. The first time period may be before the second time period, or vice versa. Such a configuration allows for an enriched flexible schema structure for meetings and recordings. As there are a plurality of metadata flows, the meeting schema and the recording schema are both independently capable of being used to create video calls.

In both call record and recording flows, a list of participants may be received and the system may determine whether any participants are flagged for data security. If no participants are flagged for data security, crawlers may forward the transformed and enriched schema data to the publisher. The crawlers may include on demand refresh as well as token refreshers to keep tokens active while API calls are performed. While publishing data, multiple messages (e.g., metadata of meetings) may be packed into a single payload to reduce the number of messages communicated to the publisher, reducing the number of packages and network requirement.

FIG. 1 illustrates an example of metadata flow in an online communications system, configured in accordance with one or more embodiments. FIG. 1 illustrates system 100 that includes metadata flow from communications session 102 to platform 108. Platform 108 may be a platform configured to receive and store metadata from communications session 102.

Communications session 102 may be a video meeting session that allows for a plurality of meeting participants to communicate and provides for video, audio, and/or chat communications capabilities. Communications session 102 may be configured to generate metadata. Such metadata may be communicated to platform 108 through one or more metadata flows, such as metadata flow 104 and metadata flow 106. Platform 108 may be a platform configured to receive and store metadata, for analysis, later retrieval, and/or other purposes. Platform 108 may be configured to associate the plurality of metadata flows of each session, so that the plurality of metadata flows may be stored within one or more databases of platform 108 in a manner that allows for the metadata flows to be associated with their own session (e.g., communications session 102). In various embodiments of the systems and techniques described herein, other communications sessions may communicate metadata through one, two, three, or four or more separate metadata flows.

Figure 2:
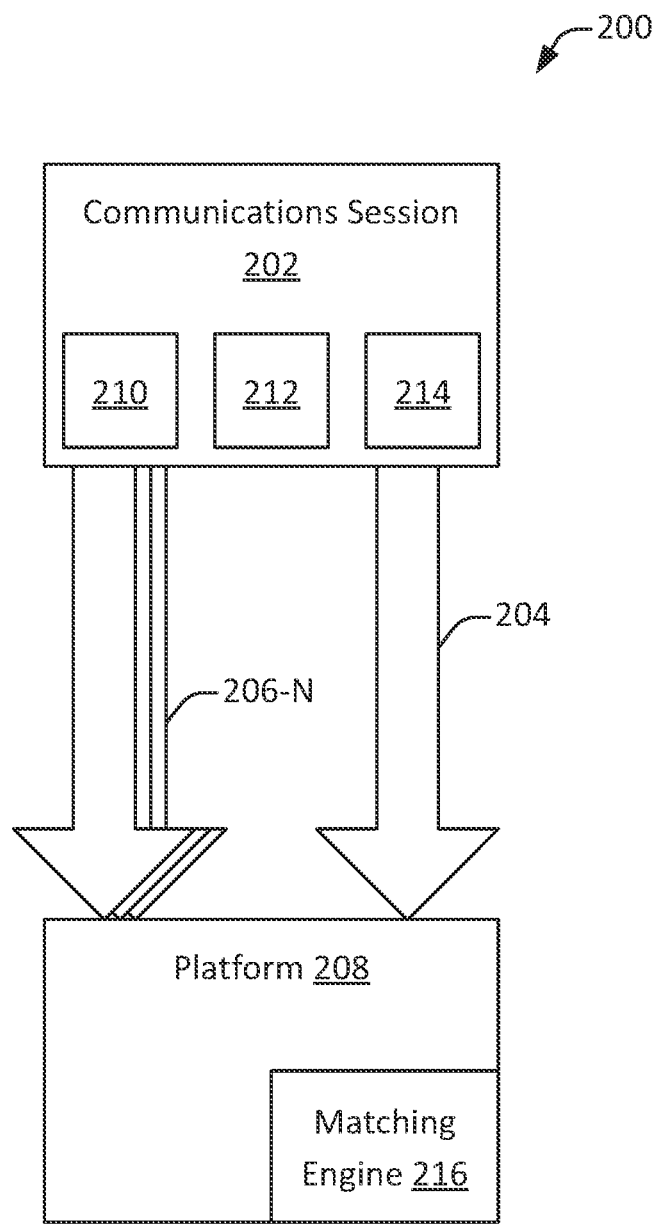
FIG. 2 illustrates an example of a metadata collection and categorization system, configured in accordance with one or more embodiments.

FIG. 2 illustrates an example of a metadata collection and categorization system, configured in accordance with one or more embodiments. FIG. 2 illustrates system 200 that includes communications session 202 and platform 208. Similar to that described in FIG. 1, communications session 202 may generate a plurality of metadata flows, such as metadata flow 204 and metadata flow 206 to platform 208.

Communications session 202 may include a plurality of subsessions, such as subsession 210, subsession 212, and subsession 214. Subsessions may include, for example, the main video meeting session, breakout sessions (e.g., a video conference may be multiple breakout sessions that may be attended by a subset of the participants), additional meetings (e.g., in a video conference that stretches for multiple hours, there may be multiple different meetings), follow-up sessions, other video sessions, and/or such sessions. For example, Coinbox may allow for a main meeting to have different break out sessions.

In such an embodiment, the metadata flows may be separate flows for each category of metadata. That is, metadata flow 204 may be a metadata flow for the metadata of the entirety of communications session 202. In the example of Coinbox, metadata flow 204 may be metadata generated with communications session 202 ends and may be, a recording notice for recording files of communications session 202 and/or the subsessions (e.g., subsession 210-214). In various embodiments, metadata flow 204 may be generated when a recording of communications session 202 has been uploaded.

Variously, metadata flow metadata flow 204 may be communicated as a plurality of separate flows. For example, a session may include a plurality of separate recordings (e.g., recordings may be started and stopped multiple times during a single meeting). Each separate recording, along with their associated metadata, may be separately provided to platform 208. The techniques described herein may be used for situations where there is a single recording for a session, as well as where a session includes a plurality of different recordings.

Metadata flow 206 may be metadata flows for various portions of communications session 202 and/or subsessions thereof. Metadata flow 206 may be, for example, call record notifications where each call record notification is associated with one of communications session 202 and/or subsessions 210-214. For example, communications session 202 and/or the subsessions (e.g., subsession 210-214) may each generate metadata, such as call record notifications, when the sessions or subsession has ended. Accordingly, metadata flow 206 may include an N plurality of metadata flows for communications session 202 as well as the various subsessions.

Platform 208 may be configured to receive the metadata flows. In various embodiments, the various metadata flows may be provided as disparate flows. That is, the metadata flows may be provided via separate streams or channels to platform 208. The various metadata flows may, alternatively or additionally, not be labeled and, thus, it may not be readily apparent that metadata flow 204 and metadata flows 206-N are all associated with one communications session (e.g., communications session 202).

Matching engine 216 may be configured to match the various received metadata flows. Thus, for example, matching engine 216 may determine that metadata flow 204 and metadata flows 206-N are all associated with communications session 202, according to the techniques described herein. Thus, matching engine 216 may be configured to annotate or store metadata flow 204 and metadata flows 206-N in a manner to indicate that they are all associated with communications session 202. In certain embodiments, matching engine 216 may also indicate which of the subsessions each metadata flow is associated with. Further techniques used in system 200, including by that of matching engine 216, are described herein. In various embodiments, matching engine 216 may include, for example, a crawler that may parse received metadata to sort and match the various metadata flows to the meetings.

Figure 3:
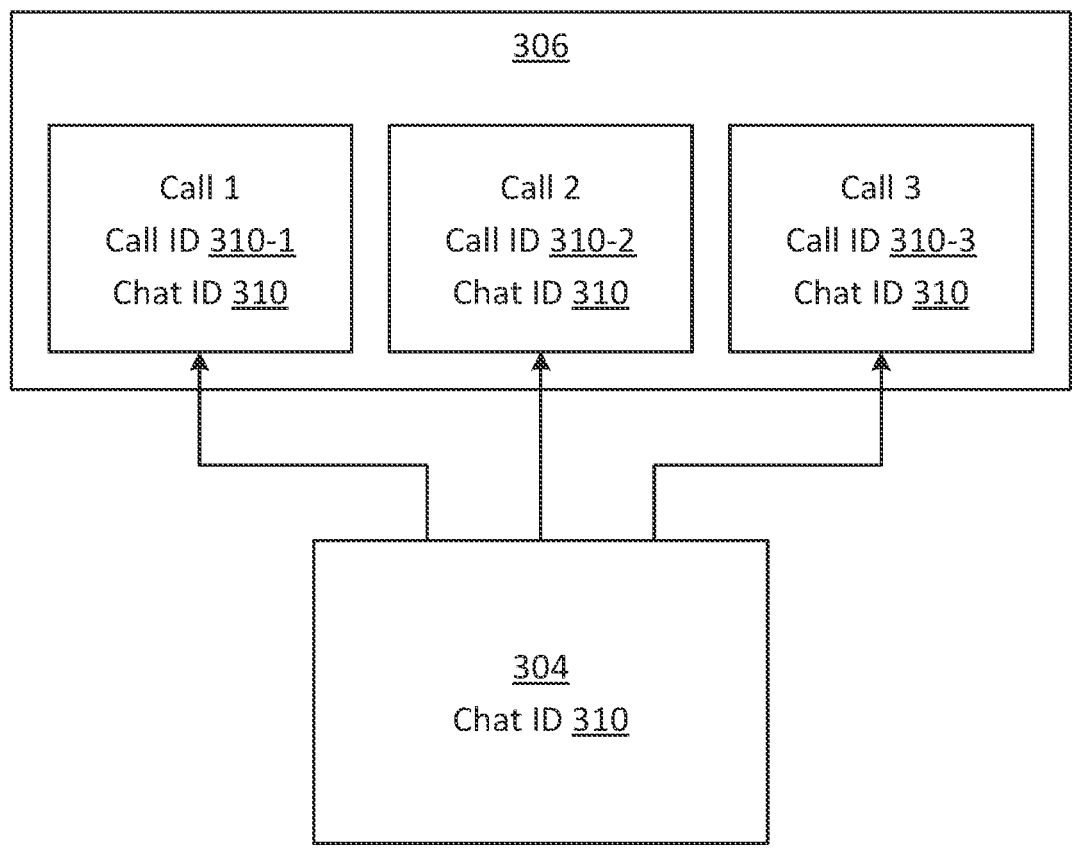
FIG. 3 illustrates an example metadata configuration of an online communications system, configured in accordance with one or more embodiments.

FIG. 3 illustrates an example metadata configuration of an online communications system, configured in accordance with one or more embodiments. FIG. 3 illustrates a metadata configuration utilized by the techniques described herein.

Metadata flow 304 may be, for example, a metadata flow for the metadata associated with the entirety of a communications session. Metadata flow 304 may be metadata generated when a communications session starts and/or ends. Metadata flow 304 may, for example, be a recording notice provided when a recording of communications session 202 has been uploaded to a database or is in the process of being uploaded to the database. In various embodiments, metadata flow 304 may include metadata such as chat ID 310, which may be a chat ID associated with the text chat of a communications session. In certain embodiments, the same chat ID 310 may be utilized by all instances of the communications session (e.g., the main session as well as any subsessions).

Metadata flow 306 may be metadata flow associated with a single instance of a communications session or subsession thereof. Thus, for example, metadata flow 306 may be a call record of a single communications session or subsession thereof. For example, in the embodiment of FIG. 3, a single communications session may include three subsessions; calls 1-3. Accordingly, metadata flow 306 may provide metadata (e.g., call records) upon the conclusion of each of calls 1-3. In certain embodiments, such metadata may include a chat ID and a call ID. The chat ID may be the same for all of the session or subsession thereof (e.g., calls 1-3 may each utilized chat ID 310). The call IDs may differ between the session and subsessions. Thus, for example, the metadata provided at the conclusion of call 1 may identify call 1 with chat ID 310-1, the metadata provided at the conclusion of call 2 may identify call 2 with chat ID 310-2, and the metadata provided at the conclusion of call 3 may identify call 3 with chat ID 310-3.

Thus, for example, Coinbox may provide a single metadata flow for the metadata of the recording that is uploaded to a partner platform. The recording may include a chat session within all individual sessions and/or subsessions. Thus, a single chat session may accommodate all of the main session and break out sessions of the main session during a meeting on Coinbox. However, Coinbox may be configured to provide separate metadata flows upon the conclusion of each of the break out sessions, as well as for the conclusion of the main session. Thus, Coinbox may continuously provide metadata from metadata flow 306 after each subsession has been conducted, but may continuously provide metadata flow 304 when a recording of the session is being uploaded or updated, or vice versa.

Figure 4:
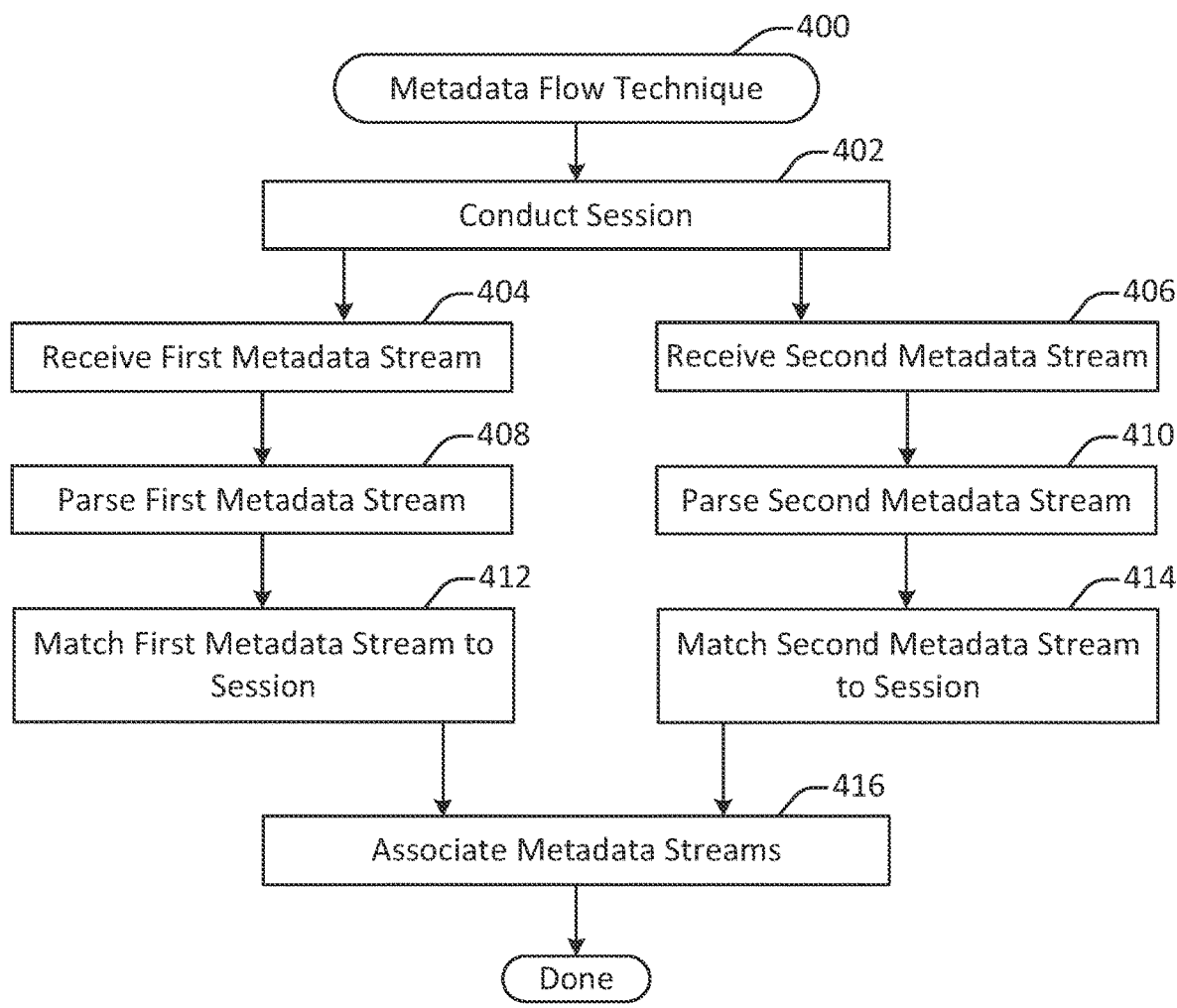
FIG. 4 illustrates an example of a method for metadata collection and categorization in an online communications system, performed in accordance with one or more embodiments.

FIG. 4 illustrates an example of a method for metadata collection and categorization in an online communications system, performed in accordance with one or more embodiments. FIG. 4 illustrates technique 400 for receiving and associating a plurality of metadata flows from a single session (which may include, in certain situations, one or more subsessions). Technique 400 may be utilized when, for example, a multi-tenant database system is configured to receive a plurality of metadata streams from an internet meeting session.

In 402, a call or meeting sessions may be conducted with a communications session. Thus, for example, a user may utilize Coinbox to conduct a video meeting session. The video meeting session may include, for example, a recording of the subsessions and/or the main session. The meeting within Coinbox may generate a plurality of metadata streams, as described herein.

In 404, a platform may receive a first metadata stream generated by the session. The first metadata stream may be any metadata or metadata flow as described herein. In 406, the platform may receive a second metadata stream generated by the session. The second metadata stream may be any metadata or metadata flow as described herein. In various embodiments, the metadata stream of 404 and 406 are different metadata streams and may include different metadata. Furthermore, the metadata streams of 404 and 406 may be provided at different periods of time and/or in a different manner (e.g., sent as one data package, in periodically updated packets, and/or in a continuous stream).

In certain embodiments, one or more metadata streams may be automatically communicated to the platform. Alternatively or additionally, metadata and/or data may be provided to one or more databases and the platform may periodically query the database to determine whether any metadata or updated metadata (e.g., additional metadata) has been received (e.g., since the last query). In certain embodiments, such databases may be continuously queried, periodically queried (e.g., every 1, 3, 5, or 10 minutes or according to another timeframe), and/or queried based on certain conditions being fulfilled (e.g., the session may provide an indication to the platform that additional metadata has been uploaded).

The technique of FIG. 4 allows for various metadata associated with a single session to be provided at different time periods. Thus, for example, the first metadata stream and the second metadata stream may be recording and call record metadata, or vice versa. Recording metadata and notification of the recording being made may be provided and/or received at a first time period and call record metadata may be provided and/or received at a second time period. The first time period may be before the second time period or vice versa. The time periods may be a point in time, a duration, and/or a combination thereof (e.g., two of non-continuous durations and/or points in time). Such a configuration allows for an enriched flexible schema structure for meetings and recordings. As there are a plurality of metadata flows, the meeting schema and the recording schema are both independently capable of being used to create or recreate video calls as a user may have access to at least one of the plurality of metadata streams even if the other metadata stream is not yet ready.

The first metadata stream is parsed in 408 and the second metadata stream is parsed in 410. Parsing of the metadata streams may include, for example, analysis of the metadata received to identify specific markers identifying that the metadata streams are all associated with a single session.

For example, one or more of call IDs, chat IDs, meeting durations (e.g., start and end times), participant identities, and/or other such metadata may be identified within the metadata streams received. In certain embodiments, one or more of the metadata streams may be metadata generated from the uploading of a recording of the session. In certain such embodiments, metadata from a recording may include the start and end time of the recording. One or more of the other metadata streams may be metadata provided from the started or conclusion of a session or subsession.

Based on the metadata parsed in 408 and 410, the metadata streams may be matched to each other in 412 and 414, respectively. Such matching may be based on the metadata identified. For example, in a certain embodiment, as the chat IDs are the same for the recordings of a session, the overall session, and/or the subsessions of the session, the same chat ID may be identified in each of the metadata streams to identify that the metadata streams are matched.

Alternatively or additionally, the recording start and/or end times may be matched to confirm that the recording is of the session. That is, the metadata stream indicating the start and/or end of the session and/or subsession may indicate the start and/or end time of the session and/or subsession. If the recording metadata indicates that the start and/or end time of the recording is within the start end/or end time of the session and/or subsession that it is associated with, a determination may be made that the recording metadata stream may be matched with the metadata stream indicating the start and/or end of the session and/or subsession. Otherwise, a determination may be made that the recording metadata stream is not associated with the metadata stream indicating the start and/or end of the session and/or subsession.

Based on matching in 412 and 414, the metadata streams may be associated with each other in 416. In certain embodiments, such association may result in the metadata streams being stored together (e.g., within the same database or database container). Alternatively or additionally, such association may result in the metadata streams being tagged (e.g., with additional date written into the metadata streams) indicating that they are associated with each other.

Figure 5:
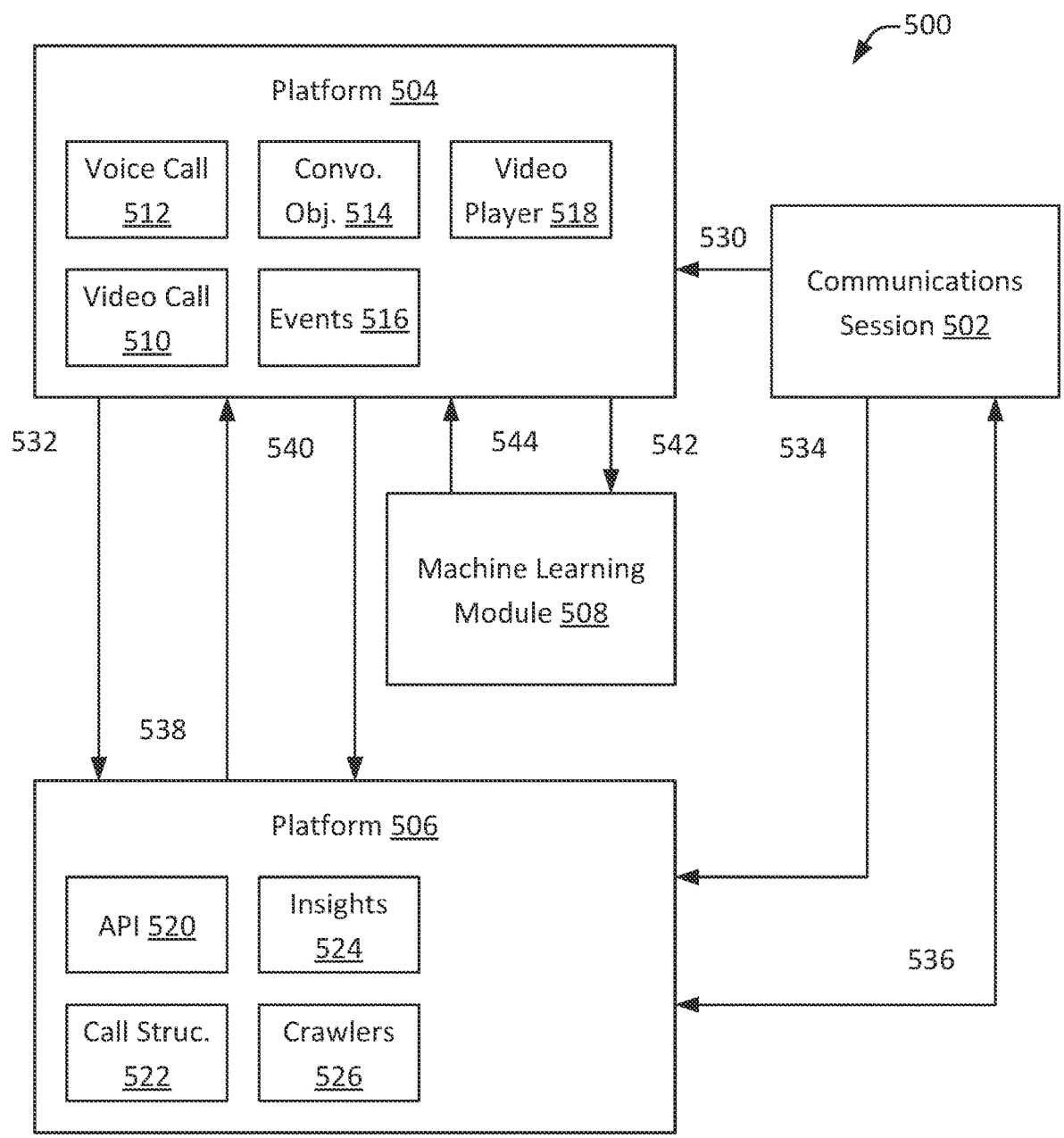
FIG. 5 illustrates another example of a metadata collection and categorization system, configured in accordance with one or more embodiments.

FIG. 5 illustrates another example of a metadata collection and categorization system, configured in accordance with one or more embodiments. FIG. 5 illustrates system 500 that includes communications session 502, platform 504, platform 506, and machine learning module 508. FIG. 5 illustrates the flow of data within system 500.

In various embodiments, communications session 502 may be an audio and/or video meeting/session as described herein. Communications session 502 may include one session (e.g., main meeting session) and/or one or more subsessions (e.g., breakout sessions). An example of communications session 502 is Coinbox by MarioSurf.

Platform 504 and platform 506 may be various platforms configured to receive data and/or metadata from communications session 502. Thus, for example, communications session 502 may provide a first metadata flow to platform 504 and a second metadata flow to platform 506. Platform 504 and platform 506 may receive the respective metadata flows and associate the metadata flows with each other.

Accordingly, platform 504 may be configured to receive recording data and/or metadata from communications session 502 in 530. Platform 504 may include voice call 510, video call 512, conversation object 514, events 516, and video player 518, which may be various modules of platform 504. As described herein, modules may be programs within a computing system (e.g., server system) and/or may include dedicated processors, memories, and/or other computing components configured to perform certain techniques. Though FIG. 5 illustrates platform 504 and platform 506 as two separate platforms, in various embodiments, each platform may be one computing device, a plurality of dedicated computing devices, computing devices that are shared with other platforms (e.g., platform 504 and platform 506 may share the same computing system), over the cloud, and/or through other configurations.

In various embodiments, platform 504 may be configured to receive data and/or metadata for voice call sessions with video call module 512, may be configured to receive data and/or metadata for video call sessions with voice call module 510, may process objects of such sessions/conversations to determine, for example, various metadata, transcripts, start times, end times, durations, and/or other such aspects. Video player 518 may be configured to play video data (e.g., recordings) as requested by a user.

Events module 516 may be configured to receive determinations of events and/or insights (e.g., start times, end times, durations, agreements, technical information, action items, and/or other such events and/or insights) from the recording uploaded by communications session 502. Such insights and/or events may be determined from the recording by, for example, machine learning module 508. Thus, for example, machine learning module 508 may receive recording data in 542, determine such events and/or insights, and provide such events and/or insights to platform 504 in 544.

Thus, call structures, video skinny objects, insights, transcripts, and/or other such data and/or metadata may be communicated from platform 504 to platform 506 in 540.

Uploading of recording data in 530 may include metadata from the recording. The recording metadata may be received by platform 504 and communicated from platform 504 to platform 506 in 532.

Platform 506 may include API 520, call structure module 522, insights module 524, and crawlers 526. API 520 may be an API that allows for the user to access stored recordings, metadata, and/or other data of platform 504 and/or platform 506. Platform 506 may be configured to receive a metadata flow in 534. The metadata flow of 534 may be call record (a.k.a. meeting) metadata flow (e.g., similar to metadata flow 306).

In various embodiments, API 520 may be configured to provide access tokens to, for example, perform API calls and/or access other portions of system 500. Access tokens may be communicated in 538 from platform 506 to platform 504. In certain embodiments, API 520 may allow for metadata to be accessed (e.g., from databases of platform 504 and/or platform 506) or for association to be performed from the metadata. Accordingly, platform 506 may request/access the recordings and/or receive metadata of the recordings of platform 504 to associate recording metadata with the appropriate call record metadata. In various embodiments, crawlers 526 may include on demand refresh as well as token refreshers to keep tokens active while API calls are performed.

Call structure module 522 may be a module configured to determine a structure of a session. For example, call structure module 522 may determine, from the metadata flow of call records, whether a session is one session or includes subsessions, the participants in the session, the duration of the sessions/subsessions, the start and end times of the sessions/subsessions, and/or other aspects. In certain embodiments, call structure module 522 may, alternatively or additionally, make such a determination from recording metadata (e.g., received in 532).

Insights module 524 may be configured to determine insights such as the call structure, any agreements made, the length of the sessions, action items, and/or other such events and/or other such insights from the data and/or metadata received.

Crawlers 526 may be data crawlers configured to determine updates to data and/or metadata stored within a database. Thus, for example, crawlers 526 may be configured to access a database of platform 506 to determine whether additional metadata has been received from communications session 502. In various embodiments, crawlers 526 may be configured to perform such determinations continuously or at certain intervals (e.g., every minute, 2 minutes, 3 minutes, 5 minutes, 10 minutes, and/or another such interval). Data and/or metadata related to video and participant details may be provided in 536, independent of the recording. In certain embodiments, crawlers 526 may receive and/or determine such aspects. Crawlers 526 may include on demand refresh as well as token refreshers to keep tokens active while API calls are performed.

Based on the data flow illustrated in FIG. 5, platform 504 and platform 506 may determine and match the recording and call record metadata flows, as well as other metadata flows, to associate the various respective metadata flows with other flows from the same session, according to the techniques described herein. Furthermore, platform 504 and/or platform 506 may create data packages that includes such associated metadata flows with other data, such as insights, that may be provided upon request by, for example, a user of system 500.

Figure 6:
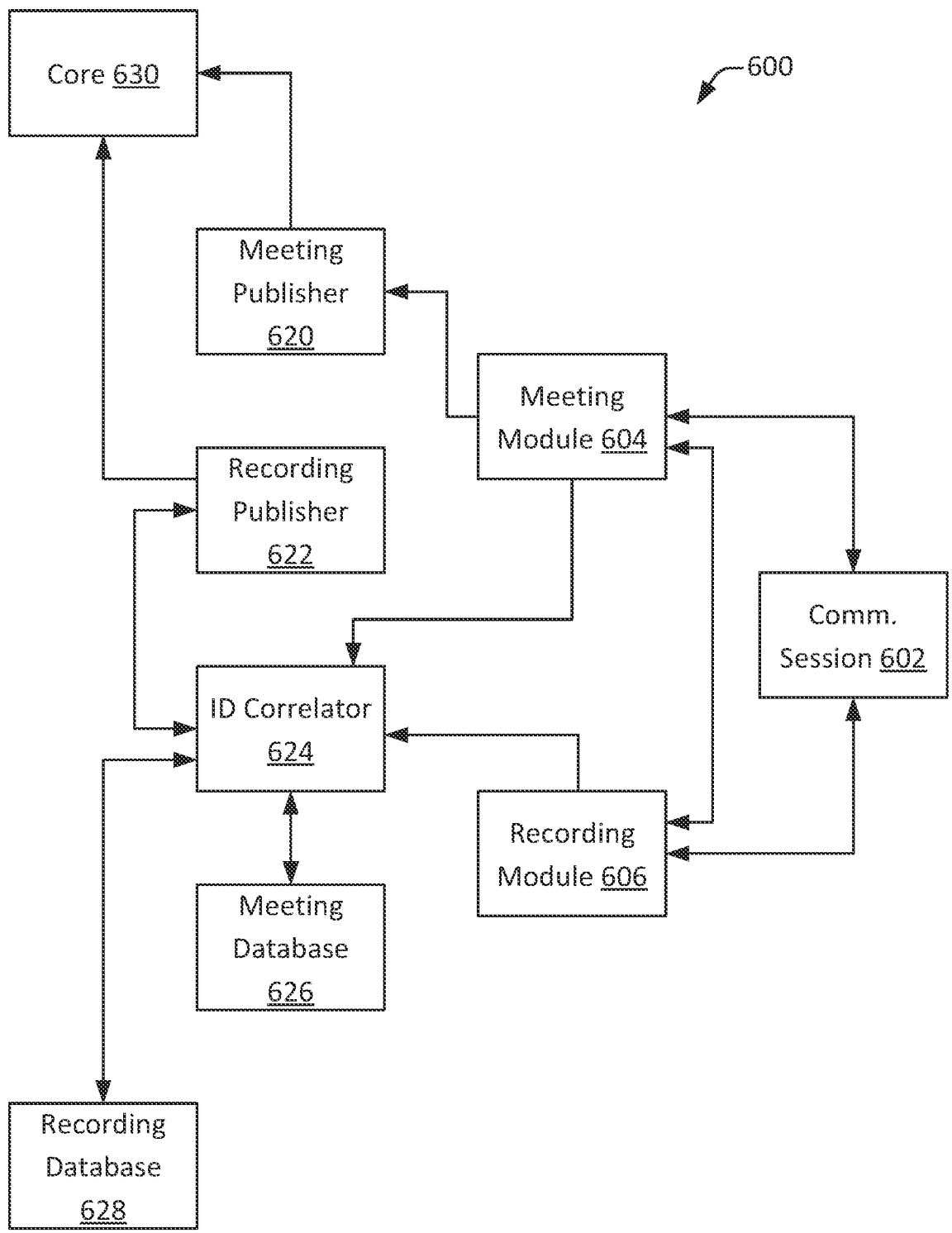
FIG. 6 illustrates a further example of a metadata collection and categorization system, configured in accordance with one or more embodiments.

FIG. 6 illustrates a further example of a metadata collection and categorization system, configured in accordance with one or more embodiments. FIG. 6 illustrates a flow of data within system 600 according to the techniques described herein. System 600 includes communications session 602, meeting module 604, recording module 606, meeting publisher 620, recording publisher 622, ID correlator 624, meeting database 626, recording database 628, and core 630. In various embodiments, system 600 may be implemented within a computing environment, as described herein (e.g., as described in other figures herein).

Communications session 602 may be a communications session as described. Communications session 602 may provide call record metadata to meeting module 604 and recordings and/or recording metadata to recording module 606. In certain embodiments, additional or alternative to communications session 602 uploading recordings to recording module 606, recording module 606 may be configured to fetch new recordings from communications session 602 on, for example, a periodic basis. Furthermore, recording module 606 may provide and/or receive updated tokens to/from communications session 602 for authentication purposes. Based on the receipt of recording metadata, recording module 606 may provide data for association with the appropriate call record metadata to meeting module 604.

In certain embodiments, communications session 602 may provide a message that a call record metadata has been provided through a webhook. The webhook may provide a notice (e.g., to meeting module 604) that updated call record metadata has been uploaded. The call record metadata itself may be uploaded to meeting module 604. Alternatively or additionally, further details of the meeting may also be communicated between communications session 602 to meeting module 604.

In various embodiments, meeting module 604 and/or recording module 606 may include metadata collectors that may collect metadata received and/or appropriately store such metadata. Metadata collected by meeting module 604 and/or recording module 606 may be provided to ID correlator 624.

ID correlator 624 may be configured to associate the recording data with the corresponding call record metadata, or vice versa, according to the techniques described herein. Thus, ID correlator 624 may parse the recording and call record metadata to determine details, such as chat ID, meeting times, and/or other such metadata, to correlate together the appropriate recording and call record metadata. Based on the association, ID correlator 624 may persist appropriately correlated meetings and recordings withing meeting database 626 and recording database 628 and fetch such meetings and recordings as needed.

In certain embodiments, core 630 may be configured to receive, store, and/or publish events where video recordings and meetings are conducted. Thus, ID correlator 624 may provide recording metadata, a notice that a recording has been stored, and/or the recording metadata itself to recording publisher 622, which may then provide notice of an event to core 630. Additionally, meeting publisher 620 may receive a notice that meeting metadata has been received from meeting module 604 and provide notice of such an event to core 630.

Core 630 may be configured to receive the metadata and automatically create core objects containing the metadata for use by other computing systems. For example, these core objects may be enhanced or associated with insights and determined call structures, determined by portions of the system described herein. Thus data package containing such associated metadata and/or core objects may be created by core 630. While publishing data, multiple messages (e.g., metadata of meetings) may be packed into a single payload to reduce the number of messages communicated to the publisher, reducing the number of packages and network requirement.

In certain embodiments, core 630 may include a database for storing recording and call record metadata and provide such metadata as needed. In various such embodiments, the actual video and audio recording and meeting data is not stored in the database of core 630 and is, instead, stored within meeting database 626 and/or recording database recording database 628 and a reference that points to the location of such data may be provided by the data package generated by core 630.

Figure 7:
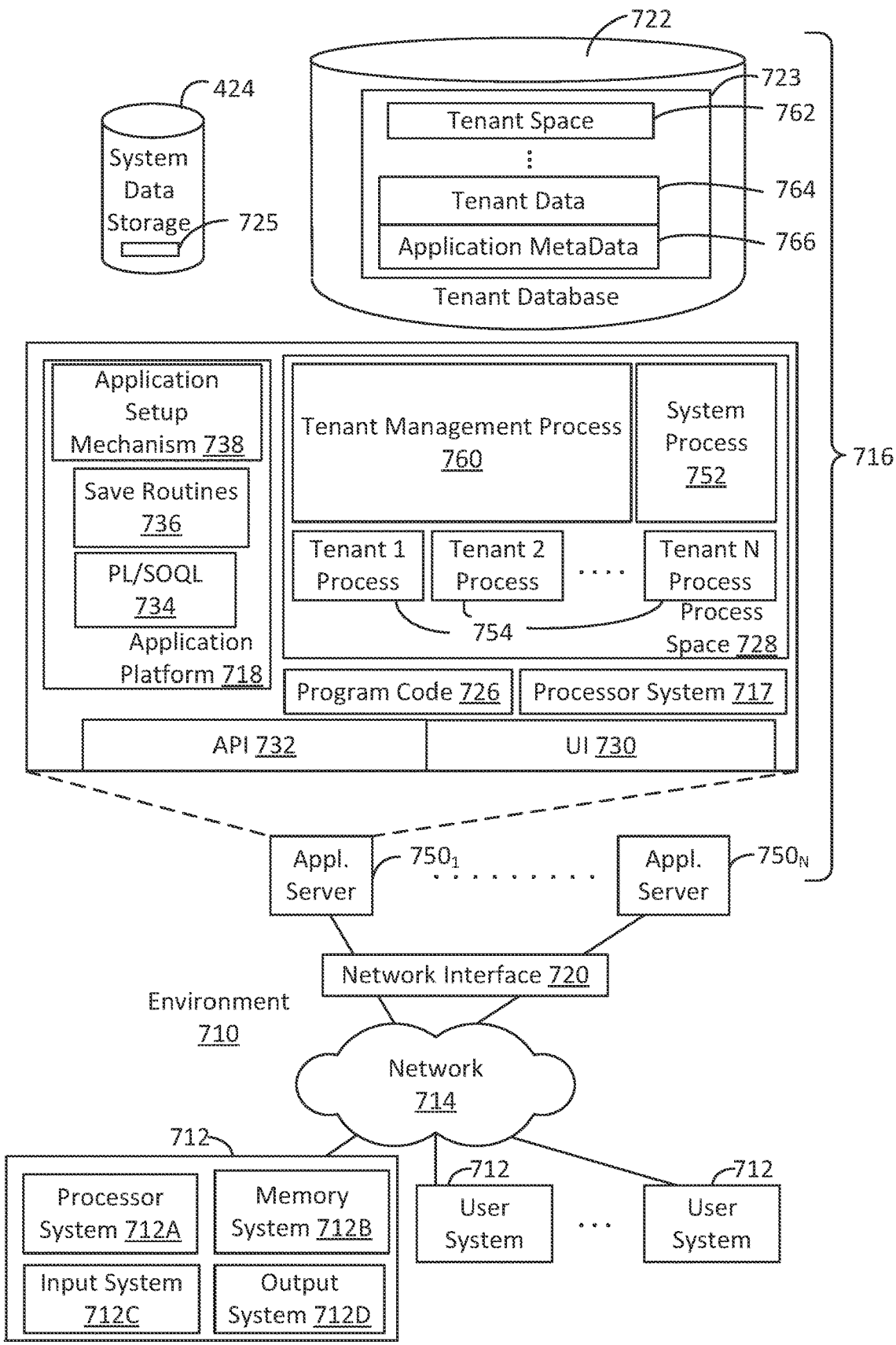
FIG. 7 shows a block diagram of an example of an environment that includes an on-demand multi-tenant resource service, configured in accordance with some embodiments.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 718 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based online meeting metadata flow system. For example, in some implementations, system 716 may include application servers configured to implement and execute online meeting metadata flow sorting software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as an online meeting system, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
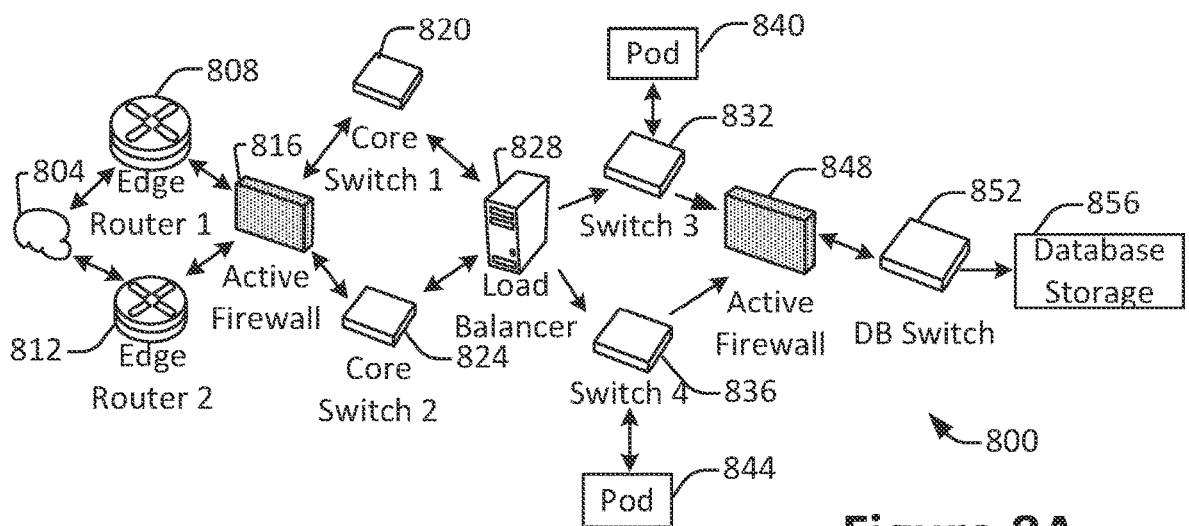
FIGS. 8A and 8B illustrate examples of a computing system, configured in accordance with one or more embodiments.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process online meeting metadata.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
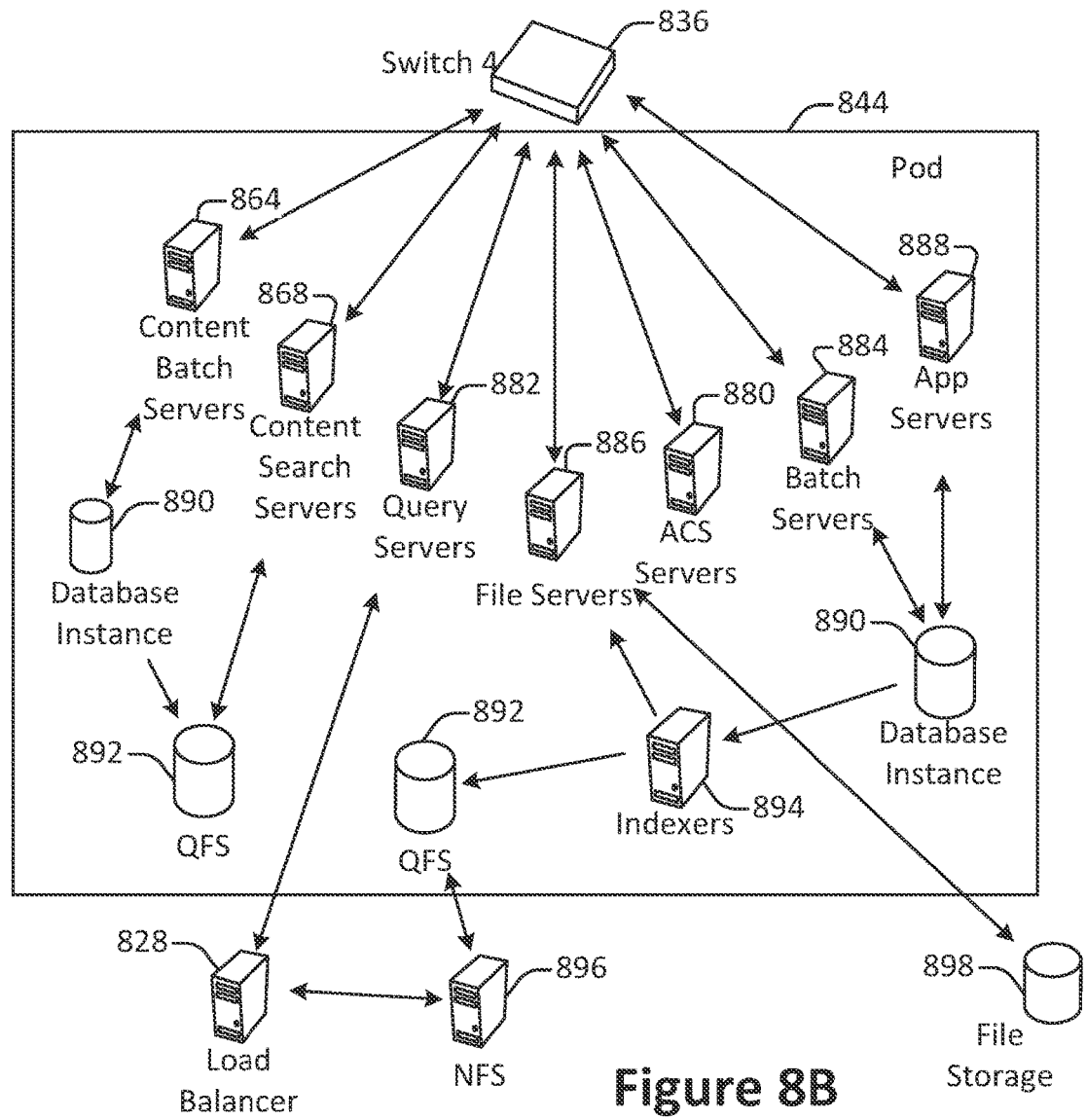

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
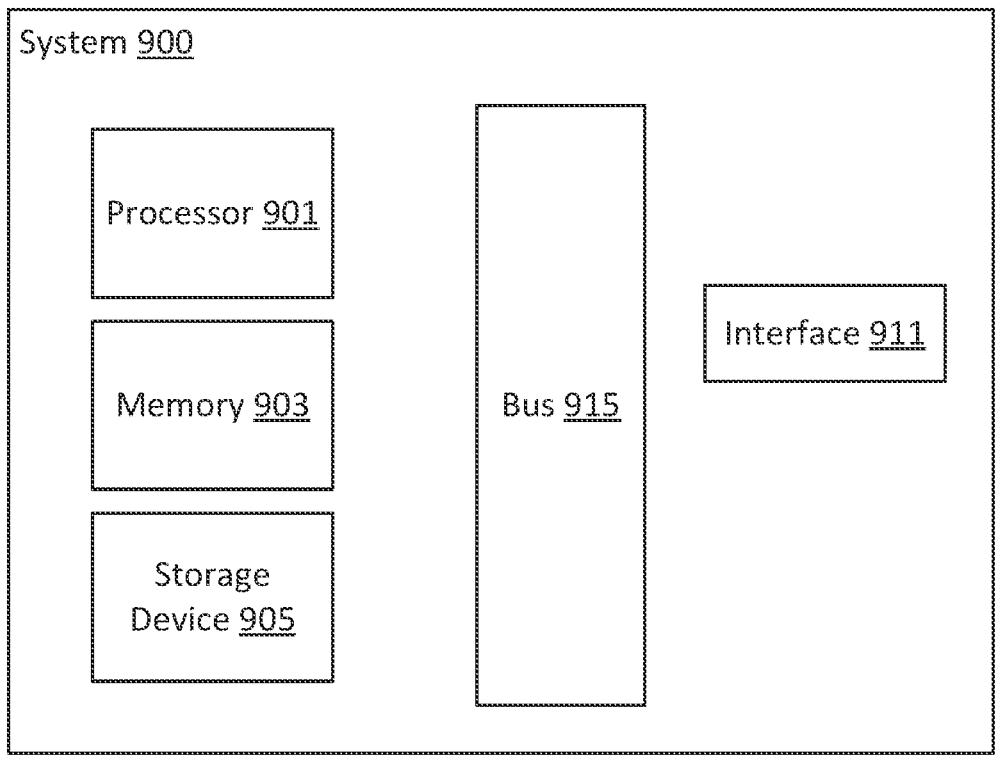
FIG. 9 illustrates an example of a computing device, configured in accordance with one or more embodiments.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A system implemented using a server system, the system comprising:
 a first platform, configurable to perform first operations comprising:
  receiving, during a first time period, a first metadata flow associated with a first data stream; and
  provide the first metadata flow to a second platform;
 the second platform, comprising a database and configurable to perform second operations comprising:
  receiving, during a second time period, a second metadata flow;
  storing the second metadata flow within the database;
  receiving the first metadata flow from the first platform;
  parsing the first metadata flow to determine an identifier metadata element within the first metadata flow;
  accessing metadata flows stored within the database;
  parsing the metadata flows stored within the first database to determine that a second metadata flow includes the identifier metadata element;
  associating the first metadata flow with the second metadata flow; and
  storing the first metadata flow and the second metadata flow in an associated manner within the database.

2. The system of claim 1, wherein the first data stream is a recording of an online meeting.

3. The system of claim 2, wherein the first metadata flow is generated by the recording.

4. The system of claim 3, wherein the second metadata flow comprises call records of a meeting associated with the recording.

5. The system of claim 4, wherein the first time period and the second time period are different time periods.

6. The system of claim 5, wherein the first metadata flow is continuously generated and wherein the second metadata flow is received at the conclusion of the meeting.

7. The system of claim 2, wherein the online meeting comprises a plurality of sessions and/or subsessions.

8. The system of claim 2, wherein the second metadata flow is associated with a chat of the online meeting.

9. The system of claim 8, wherein both the first metadata flow and the second metadata flow comprise a chat ID.

10. The system of claim 2, wherein the second platform is further configurable to perform second operations comprising:
 storing the recording in a recording database.

11. The system of claim 1, wherein the parsing the metadata flows comprises determining one or more of chat IDs, call IDs, call transcripts, and chat transcripts.

12. A method comprising:
receiving, during a first time period, a first metadata flow associated with a first data stream;
parsing the first metadata flow to determine an identifier metadata element within the first metadata flow;
accessing metadata flows stored within a first database;
parsing the metadata flows stored within the first database to determine that a second metadata flow includes the identifier metadata element, wherein the second metadata flow is received at a second time period;
associating the first metadata flow with the second metadata flow; and
storing the first metadata flow and the second metadata flow in an associated manner within the first database.

13. The method of claim 12, wherein the first data stream is a recording of an online meeting, and wherein the first metadata flow is generated by the recording.

14. The method of claim 13, wherein the second metadata flow comprises call records of a meeting associated with the recording.

15. The method of claim 14, wherein the first time period and the second time period are different time periods.

16. The method of claim 15, wherein the first metadata flow is continuously generated and wherein the second metadata flow is received at the conclusion of the meeting.

17. The method of claim 13, wherein the second metadata flow is associated with a chat of the online meeting.

18. The method of claim 17, wherein both the first metadata flow and the second metadata flow comprise a chat ID.

19. The method of claim 13, further comprising:
storing the recording in a second database.

20. The method of claim 12, wherein the parsing the metadata flows comprises determining one or more of chat IDs, call IDs, call transcripts, and chat transcripts.

* * * * *